(12) United States Patent
Rao et al.

(10) Patent No.: US 10,268,418 B1
(45) Date of Patent: Apr. 23, 2019

(54) ACCESSING MULTIPLE DATA SNAPSHOTS VIA ONE ACCESS POINT

(71) Applicant: EMC Corporation, Hopkinton, MA (US)

(72) Inventors: Vinay G. Rao, Bangalore (IN); Ning Wu, Northborough, MA (US); Michael Ferrari, Shrewsbury, MA (US); Arieh Don, Newton, MA (US); Michael E. Specht, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 15/087,188

(22) Filed: Mar. 31, 2016

(51) Int. Cl.
*G06F 12/16* (2006.01)
*G06F 3/06* (2006.01)

(52) U.S. Cl.
CPC .......... *G06F 3/0659* (2013.01); *G06F 3/0626* (2013.01); *G06F 3/0673* (2013.01)

(58) Field of Classification Search
CPC combination set(s) only.
See application file for complete search history.

(56) References Cited

U.S. PATENT DOCUMENTS

| | | | |
|---|---|---|---|
| 8,898,409 B1* | 11/2014 | Natanzon | G06F 11/00 711/162 |
| 2011/0137867 A1* | 6/2011 | Nonaka | G06F 11/1435 707/649 |

\* cited by examiner

*Primary Examiner* — Yong J Choe
(74) *Attorney, Agent, or Firm* — Krishnendu Gupta; Jason Reyes; Anne-Marie Dinius

(57) ABSTRACT

A system, computer program product, and computer-executable method, including creating a production Logical Unit (LU) and one or more snapshots of the production LU on a data storage system, wherein the data storage system provides an interface to the production LU and each of the one or more snapshots, receiving an I/O request at the interface to the production LU, analyzing the received I/O request to determine whether a code is embedded in the received I/O request, and processing the received I/O request based on the code, wherein the received I/O request is enabled to be sent to the production LU or a first snapshot of the one or more snapshots based on the code.

20 Claims, 8 Drawing Sheets

ACCESSING MULTIPLE DATA SNAPSHOTS VIA ONE ACCESS POINT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method, including creating a production Logical Unit (LU) and one or more snapshots of the production LU on a data storage system, wherein the data storage system provides an interface to the production LU and each of the one or more snapshots, receiving an I/O request at the interface to the production LU, analyzing the received I/O request to determine whether a code is embedded in the received I/O request, and processing the received I/O request based on the code, wherein the received I/O request is enabled to be sent to the production LU or a first snapshot of the one or more snapshots based on the code.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
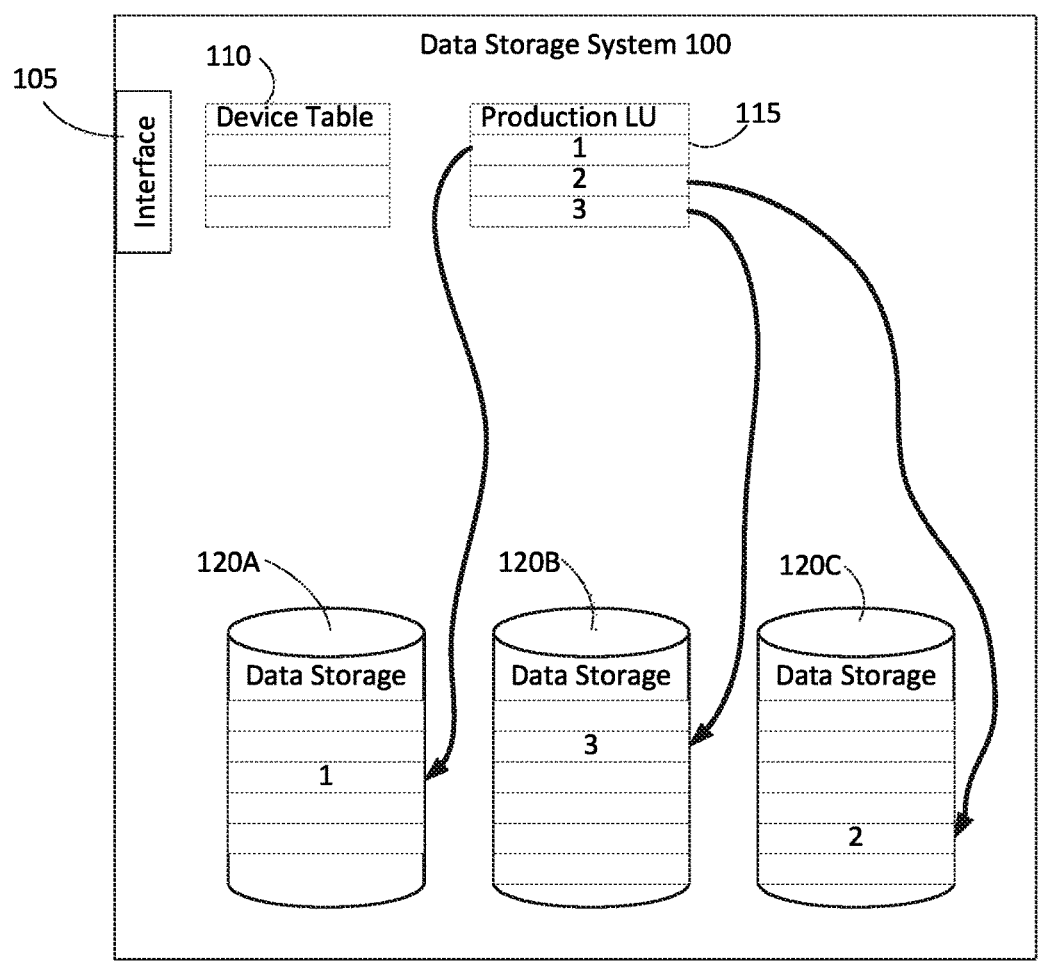
FIG. 1 is a simplified illustration of a data storage system providing a production Logical Unit (LU), in accordance with an embodiment of the present disclosure.

Traditionally, in modern day storage systems, the availability of multiple point in time (PIT) snapshots have greatly benefited data storage providers and data storage consumers. Generally, multiple PIT snapshots can enable quick recovery from data storage failures, support analytics of various scenarios, support research, as well as have various other uses. Conventionally, multiple snapshot access is needed, but today concurrently accessing various data points in time (i.e. multiple snapshots) requires multiple SCSI access points. Generally, multiple access points require a large amount of resources, such as data storage, CPU time, RAM, and/or other resources to facilitate multiple access points. Conventionally, improvements to snapshot access in data storage systems would be beneficial to the data storage industry.

In many embodiments, the current disclosure may enable access to multiple snapshots concurrently while only using a single Logical Unit (LU) interface. In various embodiments, the current disclosure may enable management of multiple snapshots and a production LU through a single interface. In certain embodiments, the current disclosure may enable access to one of a plurality of snapshots by sending an I/O request to an interface of a production LU. In some embodiments, the current disclosure may be enabled to modify an interface command to specify whether a message may be directed towards a production LU or any other associated snapshot associated with the interface and the production LU.

In most embodiments, a data storage system may be enabled to provide an interface to a production Logical Unit (LU). In various embodiments, the data storage system may be enabled to create multiple PIT snapshots of data from the production LU. In certain embodiments, a data storage system may be enabled to create and/or manage a plurality (i.e. 128) of snapshots based off a production LU. In some embodiments, a data storage system may be enabled to provide access to one or more snapshots through an interface for a production LU. In many embodiments, a host may be enabled to access a snapshot by passing a code to an interface of a production LU. In various embodiments, a code may be a number and/or other information embedded within an interface command sent to a data storage system. In some embodiments, a number embedded in an I/O cmd may be enabled to signify which snapshot the I/O cmd may be directed towards.

In most embodiments, an interface command may include reserved bytes and/or free bits within one or more bytes of the interface command. In an embodiment, a SCSI command includes a reserve byte and a free bits within a control byte of the SCSI command. In some embodiments, a code may be included within a reserve byte, within the free bits of the control byte, or using both portions of space within a SCSI command. In some embodiments, if a reserve byte is greater than "0" there may be included a code within the reserved byte that signals that a SCSI command is directed towards a snapshot. In other embodiments, if a reserved byte is "0" this may signal that a SCSI command is directed towards a production LU. In certain embodiments, bit 1 of a control byte may be used to signal that bits 2-7 may include a code. In some embodiments, a combination of bits from the reserved byte and the control byte may contain a code.

In many embodiments, a host and/or host application may communicate with a data storage system to access a production LU and/or one or more snapshots. In various embodiments, a host and/or host application may be enabled to access a production LU and/or associated snapshots utilizing a single interface at the data storage system. In certain embodiments, a host and/or host application may be enabled to pass a code along with an I/O command to an interface of a data storage system to access either a production LU or any associated snapshots. In these embodiments, a single interface may be enabled to handle all I/Os for a production LU and associated snapshots. In most embodiments, a code may include a snapshot number, and encoded snapshot value, and/or a set of values specifying whether a host and/or host application may be communicating with a production LU or a snapshot associated with the production LU.

In many embodiments, a host may include multiple layers that may enable communication with a data storage system. In some embodiments, a host may include an application layer, an Operating system (OS) layer, a file system layer, a driver layer, and/or an interface layer (i.e. SCSI). In various embodiments, a host's layers may be enabled to work together to create an I/O command for a data storage system. In most embodiments, an application may create an I/O request and send the request to the OS Layer. The OS Layer may communicate with a data storage system driver to create an I/O Command for a data storage system. The data storage system driver may communicate with an interface layer to create an interface command to send to the interface at a data storage system. In some embodiments the interface layer may be a scsi driver that may create scsi commands for a scsi interface on a data storage system. In some embodiments, an interface layer may be enabled to populate reserved bytes and/or bits of a created interface command. In other embodiments, a host may create a filter driver that may be enabled to modify an interface command after an interface layer creates the interface command. In certain embodiments, a filter driver may sit below an interface layer to modify an interface command before the interface command is sent to a data storage system.

In most embodiments, a data storage system may include an interface for a LU. In various embodiments, a data storage system may be enabled to utilize an interface for a LU to provide access to one or more snapshots associated with the LU. In certain embodiments, an interface may receive an I/O command from a host and/or host application. In some embodiments, an interface may be enabled to retrieve a code from the I/O command to determine whether the I/O command may be directed towards a production LU or any associated snapshots. In many embodiments, the code may be embedded within an I/O command. In various embodiments, a code may be placed within a reserved byte and/or reserved bits within an I/O command. In certain embodiments, a code may be a number signifying where an I/O command may be directed. In some embodiments, a code of "0" may signify that an I/O command may be directed to a production LU associated with an interface. In other embodiments, a code of "5" may signify that an I/O command may be directed to snapshot "5" associated with a production LU.

Refer to the example embodiment of FIG. 1. FIG. 1 is a simplified illustration of a data storage system providing a production Logical Unit (LU), in accordance with an embodiment of the present disclosure. Data storage system 100 is enabled to provide data storage to one or more host applications on one or more hosts. Data storage system 100 utilizes interface 105 and device table 110 to provide access to production Logical Unit (LU) 115. In this embodiment, device table 110 is a host table that enables matching information received at interface 105 with device number within data storage system 100. In most embodiments, a device name may be needed when using a SCSI interface to reference each LU and/or snapshot that may be accessed from the interface 105. Production LU 115 includes a pointer table to storage found within data storage (120A-C, 120 Generally). In this embodiment, the three entries, as shown in Production LU 115, are stored at different portions of data storage. Entry 1 is stored at data storage 120A, entry 2 is stored on data storage 120C, and entry 3 is stored on data storage 120B.

Figure 2:
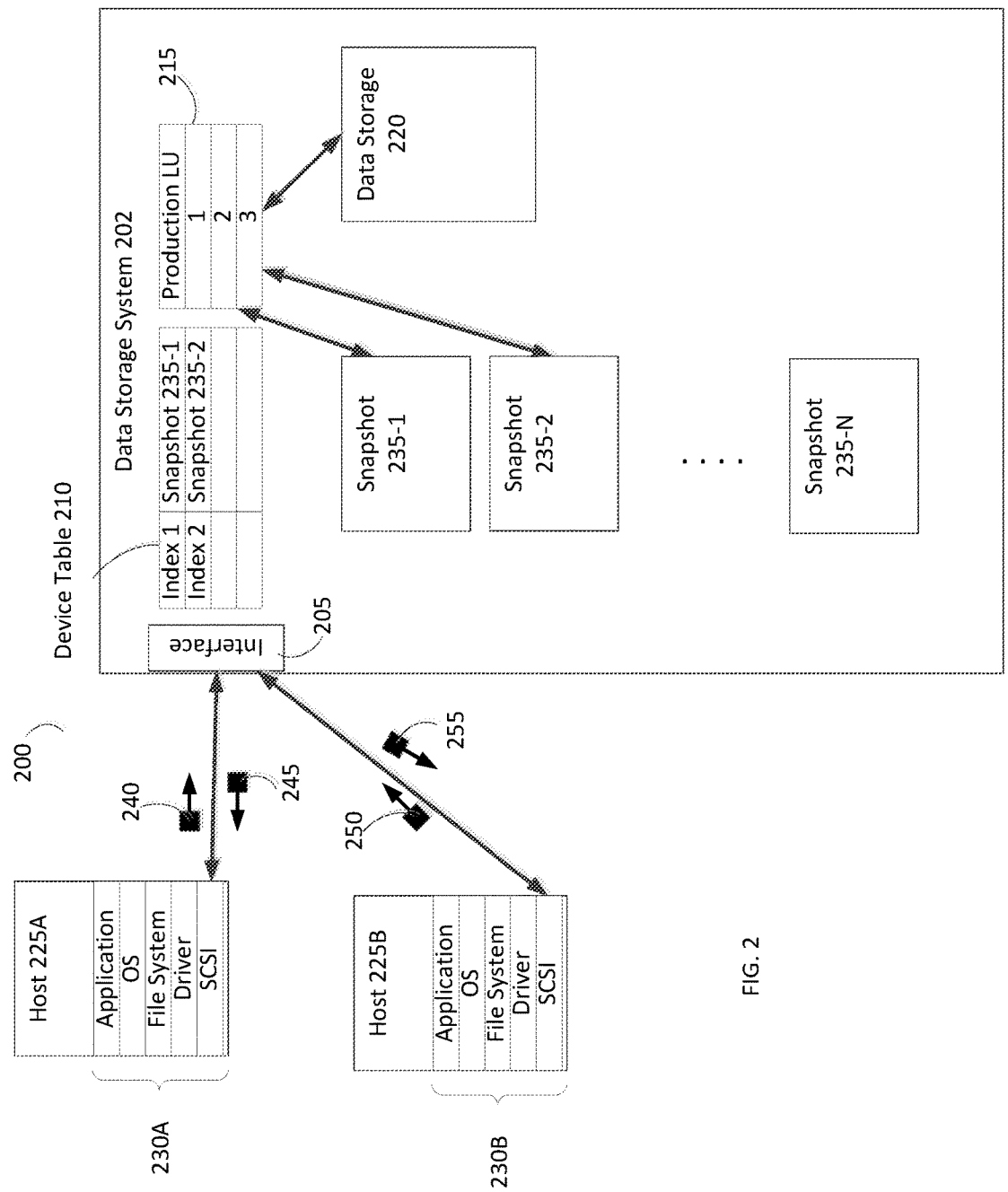
FIG. 2 is a simplified illustration of a data storage system providing access to data storage and snapshots, in accordance with an embodiment of the present disclosure.

Refer to the example embodiment of FIG. 2. FIG. 2 is a simplified illustration of a data storage system providing access to data storage and snapshots, in accordance with an embodiment of the present disclosure. System 200 includes data storage system 202, host 225A and host 225B. Data storage system 202 provides production LU 215 using interface 205. Data storage system 202 utilizes data storage 220 to provide production LU 215 physical capacity for Host 225A. data storage system 202 is enabled to provide access to snapshots (235-1 . . . N, 235 Generally) through interface 205. In this embodiment, each of the snapshots 235 are based on production LU 215. Host 225A is a production Host execution one or more production applications utilizing production LU 215 on data storage system 202. Data storage system 202 is enabled to provide access to production LU 215 and snapshots 235 using one of interface 205 and a device table. Traditionally, older system required an interface for any LU or snapshot to be accessible outside of a data storage system.

In this embodiment, Host 225A includes stack 230A which includes an application layer, operating system (OS) layer, file system layer, driver layer, and a SCSI layer (i.e., an interface layer). To communicate with production LU 215, stack 230A on host 225A is enabled to send and receive I/O commands to data storage system 202 using message

240. An I/O command is enabled to originate from an application, which communicates with other layers to create and send an I/O command to data storage system 202. When creating an I/O command, the application layer communicates with the OS Layer to access the driver layer. The driver layer calls the SCSI layer to create a SCSI command to send to data storage system 202. After the SCSI command is created, the driver layer embeds a code (the code to be used by the storage array to signal which device the SCSI command is intended to communicate with) into a reserved portion of the SCSI command and sends the SCSI command to interface 205 using message 240. In this embodiment, a "0" is embedded into a reserved byte of the I/O command in message 240 because Host 225A is solely communicating with Production LU 215.

Upon receipt of message 240, interface 205 uses device table 210, only if the code is non zero, to analyze message 240 and determines that the I/O request within message 240 is directed towards production 215. Data storage system 202 is enabled to process the received I/O request and respond using message 245. In many embodiments, message 245 may include an acknowledgement to message 240. In other embodiments, message 245 may include requested information that was requested by message 240.

Host 225B is in communication with data storage system 202 to gain access to snapshots 235. In many embodiments any host in communication with data storage system 202 may be enabled to communicate with any of the snapshots 235. To communicate with snapshots 235, Stack 230B on Host 225B communicates with interface 205 on data storage system 202. Within stack 230B, an application layer communicates with an OS Layer to communicate with a driver layer and a SCSI layer to create and I/O command to send to interface 205. Application Layer, within stack 230B, creates an I/O request and sends it to a driver layer. The driver layer calls the SCSI layer to create a SCSI command. The driver layer, in stack 230B, is enabled to embed a code within the created SCSI command to specify which snapshot of snapshots 235 that the application on host 225B wants to communicate with.

The interface 205, within data storage system 202, is enabled to use portions of an incoming message, such as message 240 or message 250) to determine whether the incoming message is for the production LU 215 or for one of the snapshots 235. The interface 205 is enabled to check the reserved byte or bits of the control byte to determine where an incoming may be directed. For example, in an embodiment, an interface 205 may determine that a value of "2" is embedded within a received message (i.e. message 240 or message 250). In this embodiment, the interface 205 checks the entries within the device table 210 to determine what is the device name associated with entry "2". In this embodiment, entry "2" corresponds with the device name for snapshot 235-2 and thus the interface 205 processes the received I/O request targeted to Snapshot 235-2.

Figure 3:
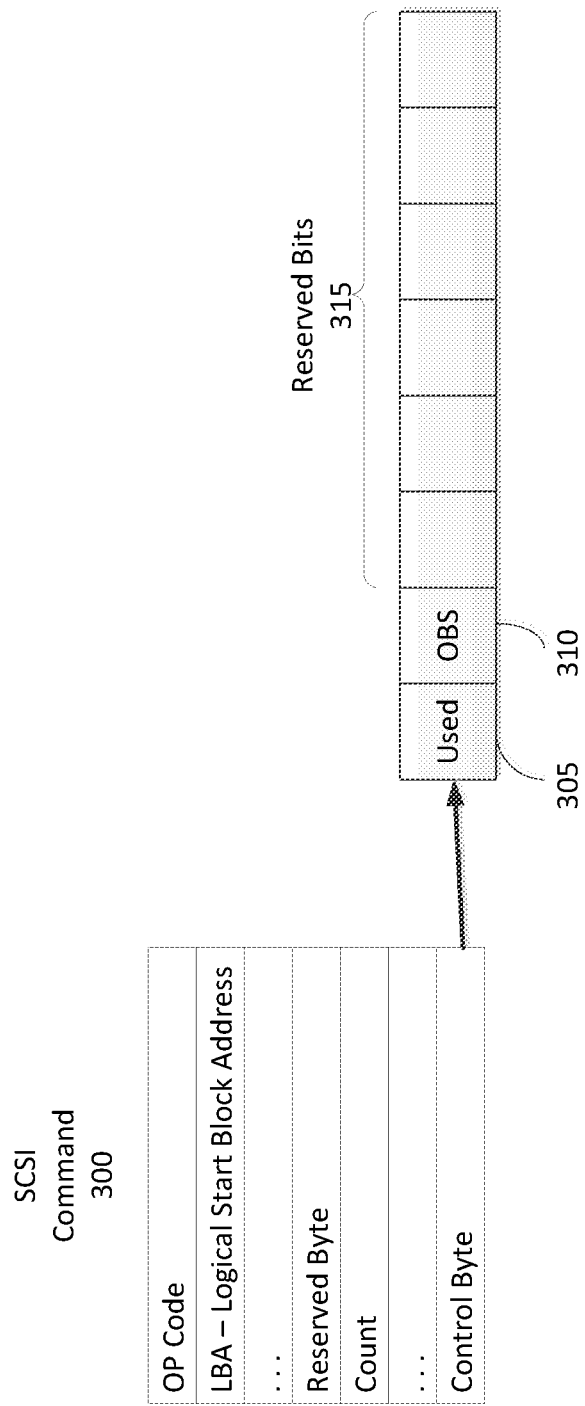
FIG. 3 is a simplified illustration of a SCSI command, in accordance with an embodiment of the present disclosure.

Refer to the example embodiment of FIG. 3. FIG. 3 is a simplified illustration of a SCSI command, in accordance with an embodiment of the present disclosure. As shown, the SCSI command includes multiple parts. The SCSI command 300 includes an OP Code, Logical Start Block Address, a reserved byte, a count, and a control byte. As shown, the Logical start block address and the count are multiple bytes. The system 200, as shown in FIG. 2, is enabled to utilize the reserved byte or the control byte to signify whether an I/O request is directed towards a production LU or an associated snapshot. A host communicating with data storage system 202 (FIG. 2) is enabled to a number within the reserved byte of a SCSI command 300 to signify where the host is directing an I/O request. The number embedded within the SCSI command 300 signals to the interface 205 (FIG. 2) which entry within the device table 210 (FIG. 2) is associated with a received SCSI command. An interface 205 is enabled to determine the device name associated with the entry from the device table 210 and thus enabled to direct the SCSI command to the correct Production LU or Snapshot, based on the embedded number. In many embodiments, a device table or a host table may be a pointer table to device names of LUs or snapshots within a data storage system. For example, in an embodiment, a host may include a "0" within the reserved byte to signal that the I/O request associated with the SCSI command is directed to the production LU. In another embodiment, a host may include a "35" within the reserved byte to signal that the I/O request associated with the SCSI command may be directed to the $35^{th}$ entry within a data storage system's device table.

In some embodiments, the control byte may be used to signal to an interface of a data storage system whether a SCSI command message is for a production LU or associated snapshot. A host is enabled to use bit 310, which is obsolete and not used in a SCSI command, to signal that a code is embedded within reserved bits 315. reserved bits 315 are then populated with a code (i.e. "25" signifying an entry within a device table) to be used by an interface of a data storage system to determine to which device number to send the SCSI command to.

Figure 4:
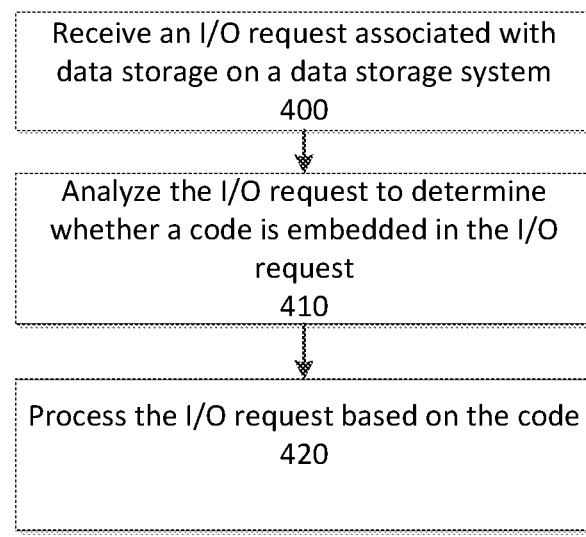
FIG. 4 is a simplified flowchart of a method of accessing multiple point in time snapshots with a single interface using a system as shown in FIG. 2, in accordance with an embodiment of the present disclosure.

Refer to the example embodiments of FIGS. 2 and 4. FIG. 4 is a simplified flowchart of a method of accessing multiple point in time snapshots with a single interface using a system as shown in FIG. 2, in accordance with an embodiment of the present disclosure. System 200 includes data storage system 202, host 225A and host 225B. Data storage system 202 provides production LU 215 using interface 205. Data storage system 202 utilizes data storage 220 to provide production LU 215 to Host 225A. Data storage system 202 receives an I/O request in message 240 (Step 400). Data storage system 202 analyzes the I/O request to determine whether a code is embedded in the I/O request within the control byte within message 240 (Step 410). Analysis of the I/O request includes looking at the reserved byte and/or bits of message 240 to determine whether a snapshot number was embedded within message 240. Data storage system 202 processes the I/O request 240 based on the embedded code (Step 420). In this embodiment, the data storage system 202 uses device table 210 to determine that the code from message 240 is "2" which signals that the I/O request in message 240 is associated with pointer index 2 in the device table, which in this case is for snapshot 235-1. As such, data storage system 202 processes the received I/O request from message 240 in reference to Snapshot 235-2. After processing the I/O request, data storage system 202 respond through interface 205 using message 245.

Figure 5:
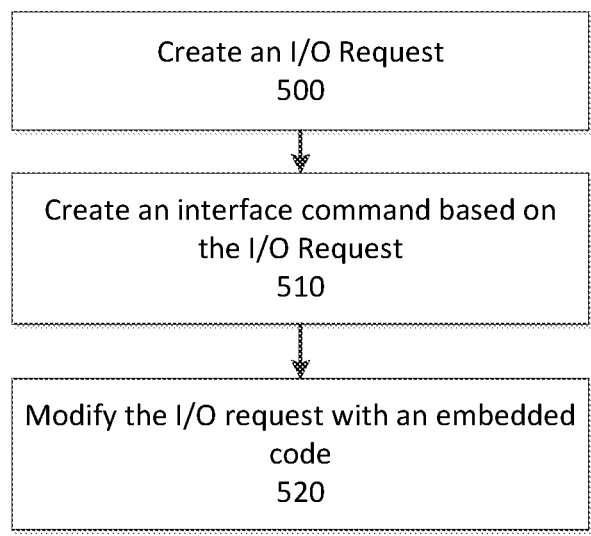
FIG. 5 is a simplified flowchart of a method of sending I/O commands to a data storage system as shown in FIG. 2, in accordance with an embodiment of the present disclosure.

Refer to the example embodiment of FIGS. 2 and 5. FIG. 5 is a simplified flowchart of a method of sending I/O commands to a data storage system as shown in FIG. 2, in accordance with an embodiment of the present disclosure. System 200 includes data storage system 202, host 225A and host 225B. Data storage system 202 provides production LU 215 using interface 205. Data storage system 202 utilizes data storage 220 to provide production LU 215 to Host 225A. Host 225B queries the data storage system 202 for device table 210 so that host 225B may be enabled to access production LU 215 as well as snapshots 235. Host 225B creates an I/O request to communicate with snapshot 235-1 (Step 500). Within stack 230B, the application layer communicates with the OS layer, which calls the driver layer to create an I/O Command. The Driver layer calls the SCSI layer to create a SCSI I/O command based off the I/O request from the application layer (Step 510). The driver layer queries local device table information to determine that Snapshot 235-1 is associated with entry "1" in the device table. The Driver layer then modifies the SCSI I/O command to embed a "1" in a reserved byte within the SCSI I/O command to signal to interface 205 that Host 225B is directing the I/O request within the SCSI I/O command to snapshot 235-1 (Step 520). The Driver layer sends the SCSI I/O command to interface 205 using message 250. Interface 205 analyzes message 250, by looking at the reserved byte in the SCSI I/O Command, to determine where to send the I/O request received in message 250. Interface 205 determines that the I/O Request in message 250 is directed to snapshot 235-1. Data storage system 202 processes the received I/O Request and sends a response to Host 225B through interface 205 using message 255.

Figure 6:
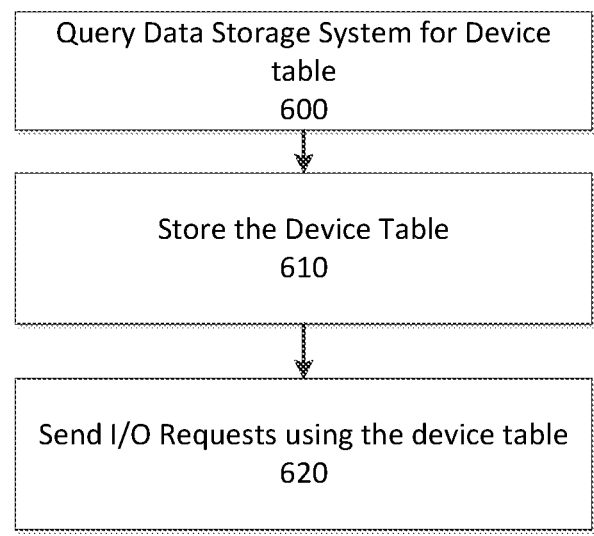
FIG. 6 is a simplified flowchart of a method of accessing multiple point in time snapshots with a single interface using a system as shown in FIG. 2, in accordance with an embodiment of the present disclosure.

Refer to the example embodiments of FIGS. 2 and 6. FIG. 6 is a simplified flowchart of a method of accessing multiple point in time snapshots with a single interface using a system as shown in FIG. 2, in accordance with an embodiment of the present disclosure. System 200 includes data storage system 202, host 225A and host 225B. Upon initialization of a host, the host queries the data storage system 202 to retrieve the device table 210 (Step 600). The device table 210 contains pointers to each of the snapshots 235 and to production LU 215. The host stores the device table (Step 610) for future use. Each sent I/O request from a host utilizes the stored device table information to specify whether the I/O request is for the production LU 215 or one of the snapshots 235 (Step 620).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

FIG. 6 is a block diagram illustrating an apparatus, such as a computer 610 in a network 600, which may utilize the techniques described herein according to an example embodiment of the present invention. The computer 610 may include one or more I/O ports 602, a processor 603, and memory 604, all of which may be connected by an interconnect 625, such as a bus. Processor 603 may include program logic 605. The I/O port 602 may provide connectivity to memory media 683, I/O devices 685, and drives 687, such as magnetic drives, optical drives, or Solid State Drives (SSD). When the program code is loaded into memory 604 and executed by the computer 610, the machine becomes an apparatus for practicing the invention. When implemented on one or more general-purpose processors 603, the program code combines with such a processor to provide a unique apparatus that operates analogously to specific logic circuits. As such, a general purpose digital machine can be transformed into a special purpose digital machine.

Figure 7:
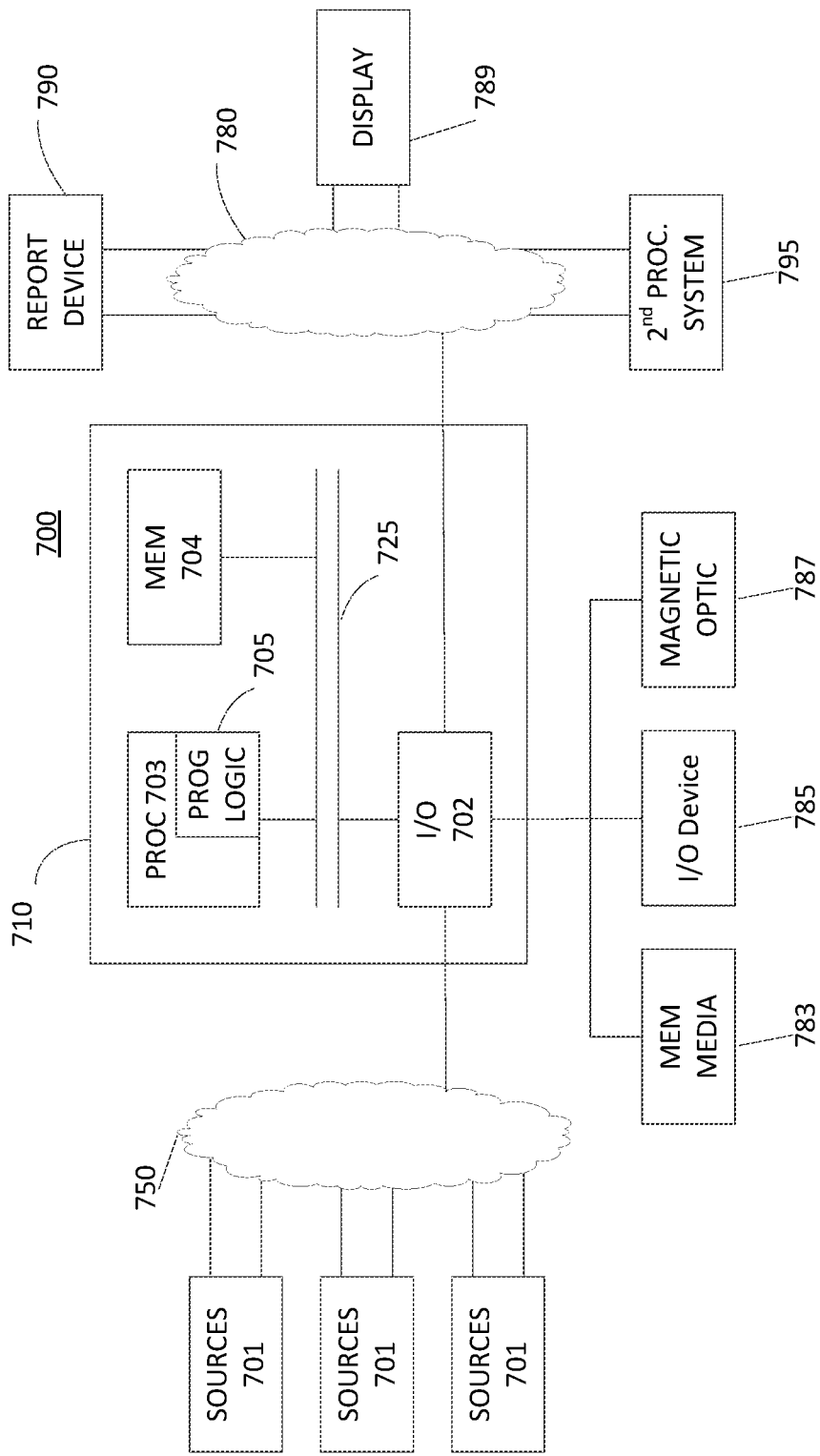
FIG. 7 is an example of an embodiment of an apparatus that may utilize the techniques described herein, in accordance with an embodiment of the present disclosure.
Figure 8:
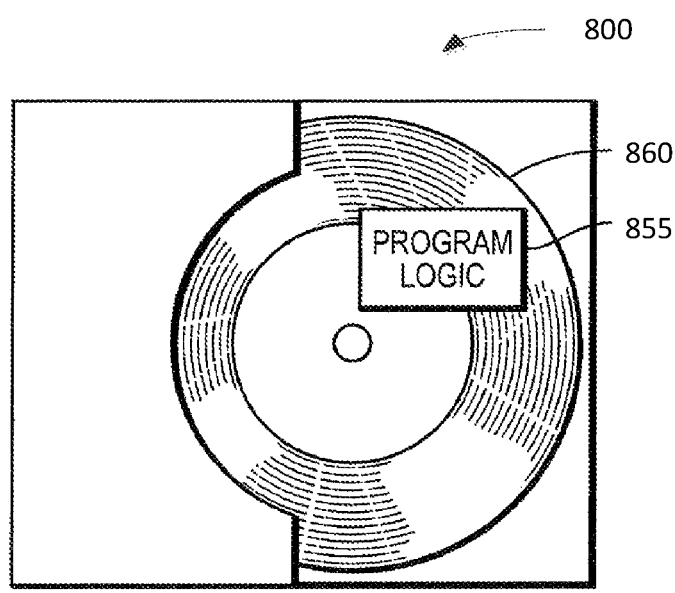
FIG. 8 is an example of a method embodied on a computer readable storage medium that may utilize the techniques described herein, in accordance with an embodiment of the present disclosure.

FIG. 7 is a block diagram illustrating a method embodied on a computer readable storage medium 760 that may utilize the techniques described herein according to an example embodiment of the present invention. FIG. 7 shows Program Logic 755 embodied on a computer-readable medium 760 as shown, and wherein the Logic is encoded in computer-executable code configured for carrying out the methods of this invention and thereby forming a Computer Program Product 700. Program Logic 755 may be the same logic 605 on memory 604 loaded on processor 603 in FIG. 6. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-7. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method, comprising:
    creating a production Logical Unit (LU) and one or more snapshots of the production LU on a data storage system, wherein the data storage system provides a small computer system interface (SCSI) interface to the production LU and each of the one or more snapshots;
    receiving an I/O request at the SCSI interface to the production LU;
    analyzing the received I/O request to determine whether a code is embedded in the received I/O request; and
    processing the received I/O request based on the code, wherein the received I/O request is enabled to be sent to each of the production LU and a first snapshot of the one or more snapshots based on the code.

2. The computer-executable method of claim 1, wherein the code is embedded in a SCSI interface command sent to the data storage system.

3. The computer-executable method of claim 1, wherein the code is embedded within a reserved portion of a SCSI interface command sent to the data storage system.

4. The computer-executable method of claim 1, wherein the code specifies whether to direct the received I/O request to the production LU or one of the one or more snapshots.

5. The computer-executable method of claim 1, wherein the code is a number specifying whether to send a received I/O request to the production LU or one of the one or more snapshots.

6. The computer-executable method of claim 1, wherein the data storage system is enabled to process I/O requests for multiple snapshots utilizing a single device table associated with the production LU.

7. The computer-executable method of claim 1, further comprising:
    wherein an application on a host is enabled to communicate with the data storage system using the SCSI interface;
    requesting, at the host, an I/O request for the first snapshot;
    creating a SCSI interface command with the I/O request; and
    modifying the SCSI interface command with an embedded code, wherein the code resides in a reserved portion of the interface command.

8. A system, comprising:
a data storage system;
computer-executable program logic encoded in memory of one or more computers enabled to provide access to one or more snapshots through a single interface, wherein the computer-executable program logic is configured for the execution of:
creating a production Logical Unit (LU) and, one or more snapshots of the production LU on a data storage system, wherein the data storage system provides a small computer system interface (SCSI) interface to the production LU and each of the one or more snapshots;
receiving an I/O request at the SCSI interface to the production LU;
analyzing the received I/O request to determine whether a code is embedded in the received I/O request; and
processing the received I/O request based on the code, wherein the received I/O request is enabled to be sent to each of the production LU and a first snapshot of the one or more snapshots based on the code.

9. The system of claim 8, wherein the code is embedded in a SCSI interface command sent to the data storage system.

10. The system of claim 8, wherein the code is embedded within a reserved portion of a SCSI interface command sent to the data storage system.

11. The system of claim 8, wherein the code specifies whether to direct the received I/O request to the production LU or one of the one or more snapshots.

12. The system of claim 8, wherein the code is a number specifying whether to send a received I/O request to the production LU or one of the one or more snapshots.

13. The system of claim 8, wherein the data storage system is enabled to process I/O requests for multiple snapshots utilizing a single device table associated with the production LU.

14. The system of claim 8, wherein the computer-executable program logic is further configured for the execution of:
wherein an application on a host is enabled to communicate with the data storage system using the SCSI interface;
requesting, at the host, an I/O request for the first snapshot;
creating a SCSI interface command with the I/O request; and
modifying the SCSI interface command with an embedded code, wherein the code resides in a reserved portion of the interface command.

15. A computer program product, comprising:
a non-transitory computer readable medium encoded with computer-executable code, the code configured to enable the execution of:
creating a production Logical Unit (LU) and one or more snapshots of the production LU on a data storage system, wherein the data storage system provides a small computer system interface (SCSI) interface to the production LU and each of the one or more snapshots;
receiving an I/O request at the SCSI interface to the production LU;
analyzing the received I/O request to determine whether a code is embedded in the received I/O request; and
processing the received I/O request based on the code, wherein the received I/O request is enabled to be sent to each of the production LU and a first snapshot of the one or more snapshots based on the code.

16. The computer program product of claim 15, wherein the code is embedded in a SCSI interface command sent to the data storage system.

17. The computer program product of claim 15, wherein the code is embedded within a reserved portion of a SCSI interface command sent to the data storage system.

18. The computer program product of claim 15, wherein the code specifies whether to direct the received I/O request to the production LU or one of the one or more snapshots.

19. The computer program product of claim 15, wherein the code is a number specifying whether to send a received I/O request to the production LU or one of the one or more snapshots.

20. The computer program product of claim 15, wherein the data storage system is enabled to process I/O requests for multiple snapshots utilizing a single device table associated with the production LU.

* * * * *